United States Patent
Shichida et al.

(10) Patent No.: US 6,445,569 B1
(45) Date of Patent: Sep. 3, 2002

(54) GAS-INSULATED SWITCHGEAR

(75) Inventors: Coichi Shichida; Masahiro Arioka, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/982,755

(22) Filed: Oct. 22, 2001

(30) Foreign Application Priority Data

Oct. 26, 2000 (JP) ......................................... 2000-327177

(51) Int. Cl.⁷ ................................................. H02B 5/00
(52) U.S. Cl. ...................... 361/604; 361/612; 361/618; 174/167; 218/155
(58) Field of Search ............................... 361/604, 605, 361/612, 613, 618; 174/52.3, 167, 30, 99 R, 176; 218/155, 43, 53, 54, 64, 107

(56) References Cited

U.S. PATENT DOCUMENTS

| | | | | |
|---|---|---|---|---|
| 3,906,149 A | * | 9/1975 | Hashoff et al. | ............. 174/167 |
| 4,823,232 A | * | 4/1989 | Marin et al. | ................. 361/619 |
| 5,902,980 A | * | 5/1999 | Reincke et al. | ............. 218/255 |
| 6,175,486 B1 | * | 1/2001 | Ponsioen | ..................... 361/605 |
| 6,268,562 B1 | * | 7/2001 | Yokoyama et al. | ........ 174/52.3 |

FOREIGN PATENT DOCUMENTS

JP 58-176814 10/1983

* cited by examiner

*Primary Examiner*—Boris Chervinsky
(74) *Attorney, Agent, or Firm*—Sughrue Mion, PLLC

(57) ABSTRACT

A gas-insulated switchgear provided with a resin mold bushing for supporting and insulating a main circuit conductor from a ground tank is miniaturized. A container portion 3a is formed by opening an end inside of the tank of a resin mold bushing 3 for supporting and insulating an internal conductor 7 from a ground tank 1 where a breaker 2 and a disconnector are accommodated. A blade-supporting conductor 5 of the disconnector for joining the internal conductor 7 and the disconnector is installed in the container portion.

3 Claims, 6 Drawing Sheets

GAS-INSULATED SWITCHGEAR

BACKGROUND OF THE INVENTION

1. Technical Field

The present invention relates to a gas-insulated switchgear, and particularly to a resin mold bushing thereof.

2. Background Art

FIGS. 5 and 6 show an example of one of conventional gas-insulated switchgears in which a resin mold bushing of a type shown therein is used.

Referring to the sectional view of FIG. 5 showing the gas-insulated switchgear, reference numeral 1 is a tank of ground potential (hereinafter referred to as a ground tank) hermetically sealed from the air, and insulating gas ($SF_6$ gas in this case) is enclosed in the ground tank. Numeral 2 is a breaker, numeral 103 is a resin mold bushing for supporting and insulating an internal conductor 7 from the ground tank 1, numeral 4 is a disconnector blade, and numeral 5 is a blade-supporting conductor for rotatably supporting the disconnector blade 4. Numeral 6 is a disconnector-fixing terminal that is engaged with the disconnector blade 4 due to turning of the disconnector blade 4 and energizes electrically, and the disconnector-fixing terminal is fixedly supported in the ground tank 1 by an insulating material not shown in the drawing. The blade-supporting conductor 5 is fixed at and electrically connected with one end in the ground tank 1 of the internal conductor 7, and the other end of the internal conductor 7 is connected with electrical machinery and apparatus or the like not shown in the drawing. Though the breaker, disconnector, bushing, and so on for three phases are actually accommodated in the ground tank, and one phase thereof is mainly shown in the drawing.

FIG. 6 is a sectional view showing the construction of the disconnector portion in FIG. 5 in detail. The internal conductor 7 and a shield 108 surrounding the internal conductor 7 are embedded in the resin mold bushing 103, and the resin mold bushing 103 is fixedly supported on the ground tank 1 by an outermost circumferential flange portion of the resin mold bushing 103 with a nut 10 and a male screw 9 that is fixed on the ground tank 1 and extends through a fixing seat 108a of this flange portion. The shield 108 possesses the metal fixing seat 108a through which the male screw 9 extends in the outer circumferential portion thereof, a cylindrical shield portion 108b composed of a metal net and arranged to be concentric with the internal conductor 7 in the central portion thereof, and a metal bar 108c joining the fixing seat 108a and the cylindrical shield portion 108b.

The resin mold bushing 103 is normally composed of epoxy resin, and when the resin mold bushing 103 is manufactured, exfoliation (peeling) force is generated at the boundary between the shield and the epoxy resin and exfoliation often occurs due to difference between a coefficient of thermal expansion of the epoxy resin and that of the metal composing the shield 108 in the process of curing and shrinking of the epoxy resin. Therefore, in the process of curing and shrinking of the epoxy resin, it is necessary that the shield have elasticity following this curing and shrinking. For this reason, the metal net is used for the cylindrical shield portion 108b. The cylindrical shield portion 108b is formed netlike, and therefore the shield 108 is manufactured by joining the parts with each other through soldering or the like.

In the gas-insulated switchgear employing the resin mold bushing of the foregoing construction, a main circuit current flows a passage through the internal conductor 7, the blade-supporting conductor 5, the disconnector blade 4, the disconnector fixed terminal 6, and the breaker 2 in the order. The cylindrical shield portion 108b prevents electric-field concentration at an edge portion 1a of the ground tank 1.

In the conventional gas-insulated switchgear of the foregoing construction, the resin mold bushing is solid, and an upper end thereof is provided with the blade-supporting conductor 5. As a result, it is not possible to diminish the height, and this makes it difficult to miniaturize a gas-insulated switchgear.

Moreover, the shield 108 of the resin mold bushing is constructed by joining the metal constituent members with each other through soldering or the like, and this causes a problem that manufacturing the shield requires much time and labor.

SUMMARY OF THE INVENTION

The present invention was made to solve the above-discussed problems and has an object of obtaining a gas-insulated switchgear having a construction in which it is possible to diminish height of a disconnector and miniaturize the gas-insulated switchgear.

Another object of the invention is to obtain a gas-insulated switchgear in which a shield of a resin mold bushing has a simple configuration so that the shield may be integrally formed into one body and the resin mold bushing is manufactured easily.

A gas-insulated switchgear according to the invention comprises: a ground potential tank in which insulating gas is hermetically enclosed; a breaker and a disconnector accommodated in the mentioned tank; a resin mold bushing for supporting and insulating a main circuit conductor connected with the mentioned disconnector from the tank, the resin mold bushing possessing a container portion with an end opened at inside of the tank and being fixedly supported on the tank; and a blade-supporting conductor being connected with the main circuit conductor insulated and supported by the mentioned resin mold bushing, the blade-supporting conductor being installed in the mentioned container portion and supporting a disconnector blade of the mentioned disconnector.

As a result, this blade-supporting conductor can be accommodated in the container portion of the resin mold bushing, and it is possible to make the switchgear compact.

It is preferable that the resin mold bushing of the gas-insulated switchgear according to the invention molds an electric-field relaxation shield is comprised of: an electric-field relaxation shield portion composed of a annular metal plate surrounding the main circuit conductor; a cylindrical fixing seat for fixing the tank installed outside the mentioned electric-field relaxation shield portion; and a metal bar for joining the electric-field relaxation shield portion and the fixing seat integrally into one body; and that the resin mold bushing also molds the container portion surrounding the main circuit conductor and having one end opened.

As a result, it is possible to follow internal stress at the time of manufacturing the resin and prevent exfoliation on the boundary between the resin and the metal, and the electric-field relaxation shield is easily manufactured into an integral construction through a manufacturing method such as casting. The blade-supporting conductor can be accommodated in the container portion of the resin mold bushing, and it is possible to make the switchgear compact.

It is also preferable that the annular electric-field relaxation shield portion is provided with a slit.

DESCRIPTION OF THE PREFERRED EMBODIMENTS

Embodiment 1

Figure 1:
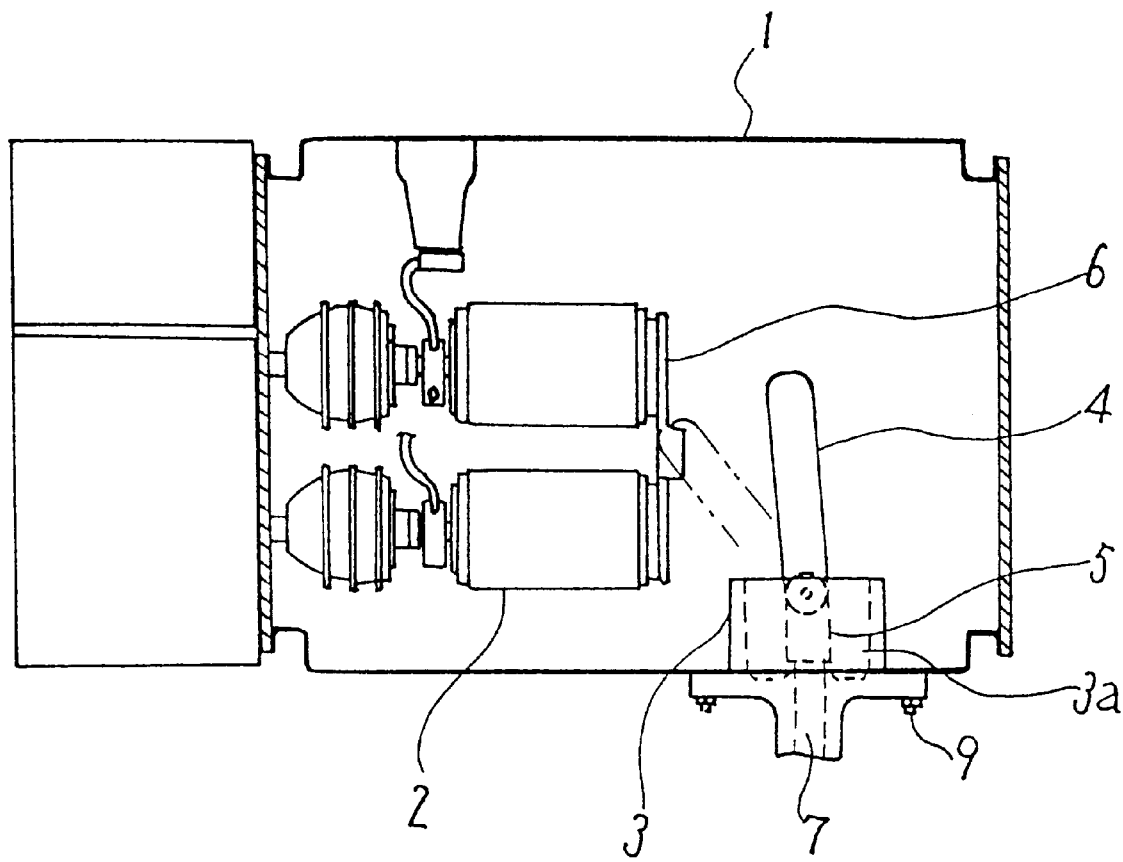
FIG. 1 is a sectional view showing a gas-insulated switchgear According to Embodiment 1 of the present invention.
Figure 2:
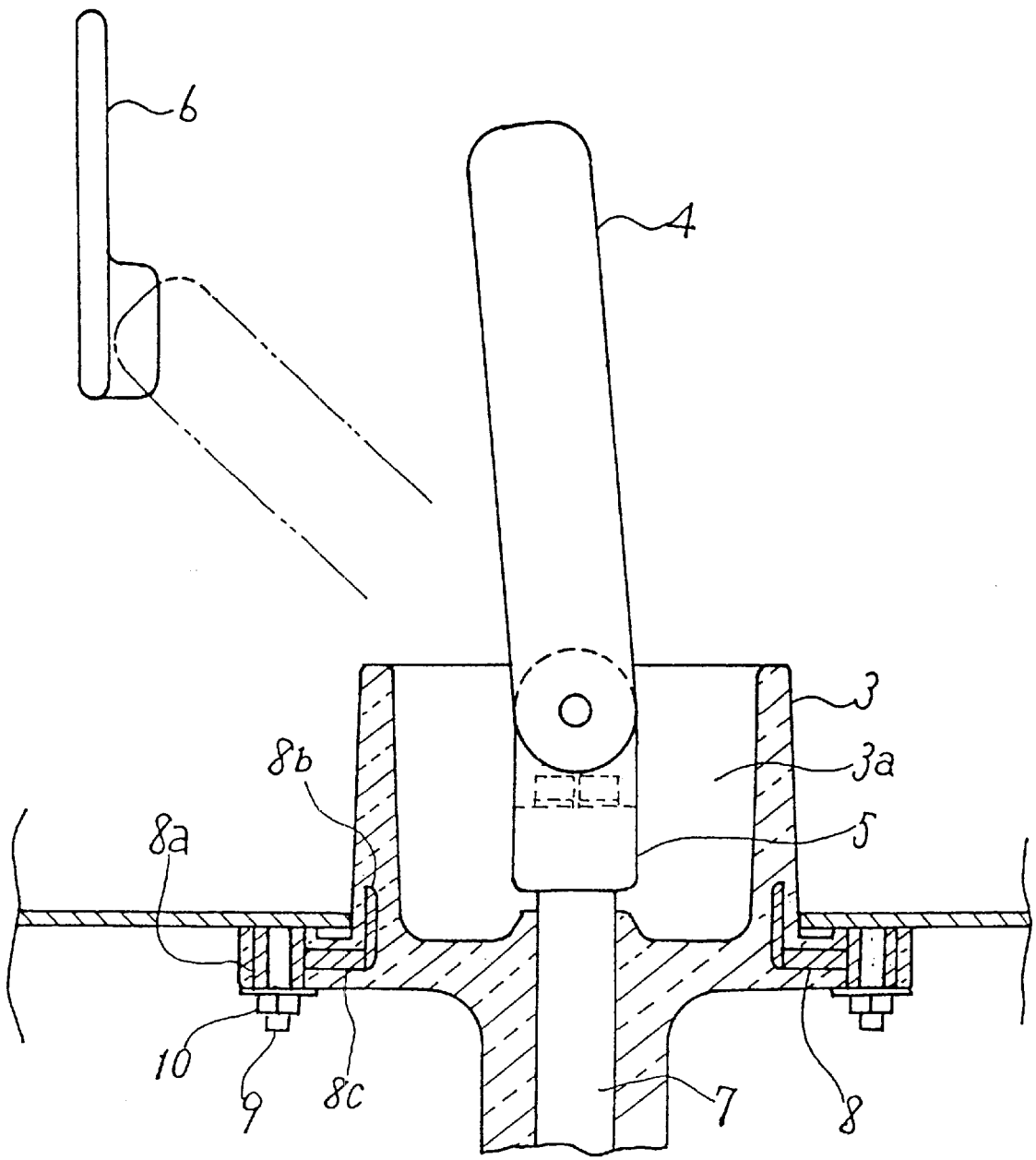
FIG. 2 is a sectional view showing a detailed construction of a disconnector portion in FIG. 1.
Figure 5:
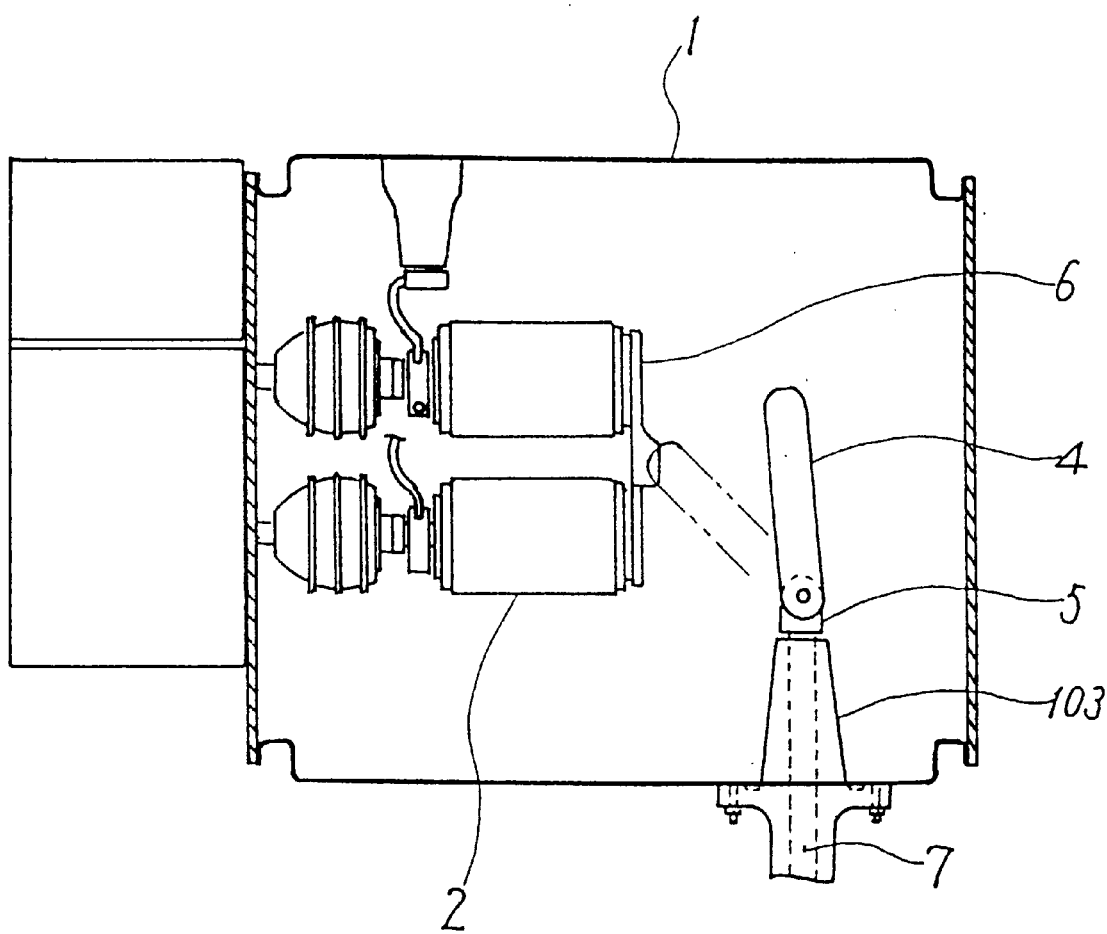
FIG. 5 is a sectional view showing a conventional gas-insulated switchgear.
Figure 6:
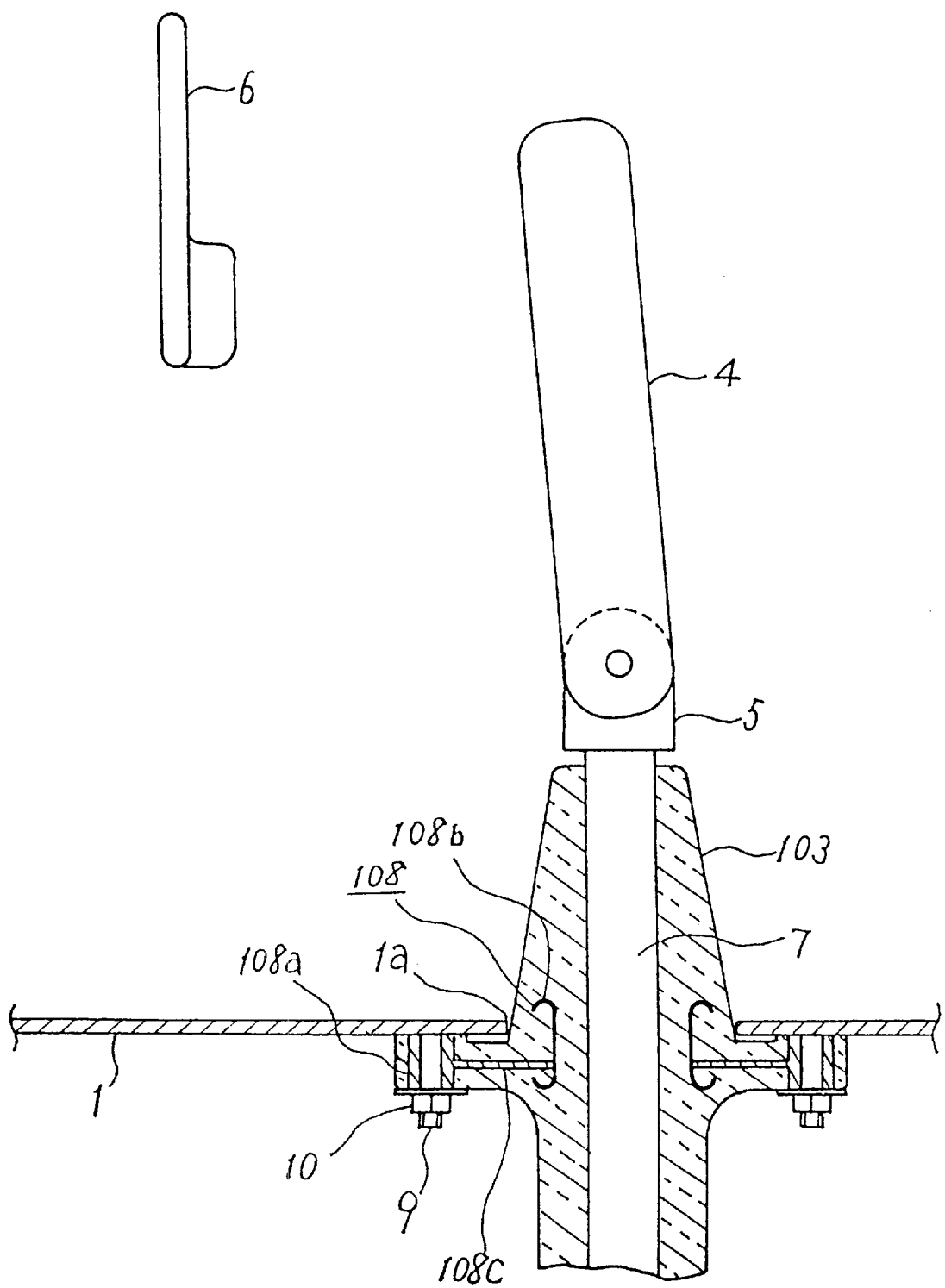
FIG. 6 is a sectional view showing a detailed construction of a disconnector portion in FIG. 5.

FIG. 1 is a sectional view showing a gas-insulated switchgear according to Embodiment 1 of the invention, and FIG. 2 is a sectional view showing in detail a construction of a disconnector portion in FIG. 1. The same reference numerals are designated to the same or like portions to those in the prior art shown in FIGS. 5 and 6. The breaker, disconnector, bushing, and so on for three phases are actually accommodated in one tank. FIG. 1 shows mainly one phase thereof.

Reference numeral 1 is a ground tank hermetically sealed from the air, and insulating gas ($SF_6$ gas in this case) is enclosed in the ground tank 1. Numeral 2 is a breaker, and numeral 3 is a resin mold bushing having a container portion 3a with an end opened on inside of the tank 1. A blade-supporting conductor 5 serving as a conductor supporting portion of the disconnector is installed in the container portion 3a. An internal conductor 7 of a main circuit conductor with one end connected with electrical machinery or the like and an electric-field relaxation shield 8 surrounding the internal conductor 7 are embedded in the resin mold bushing 3. This resin mold bushing 3 is fixedly supported on the ground tank 1 with a nut 10 and a male screw 9 that is fixed onto the ground tank 1 and extends through an outermost circumferential flange portion via a fixing seat 8a. A blade-supporting conductor 5 for rotatably supporting a disconnector blade 4 serving as a disconnector conductor is fixed at an upper end of the internal conductor 7 with a bolt or the like, and the blade-supporting conductor 5 is electrically connected with the internal conductor 7. Instead of manufacturing the blade-supporting conductor 5 and the internal conductor 7 separately and fixing the blade-supporting conductor 5 with a bolt or the like, it is also preferable to manufacture the blade-supporting conductor 5 and the internal conductor 7 integrally into one body.

Figure 3:
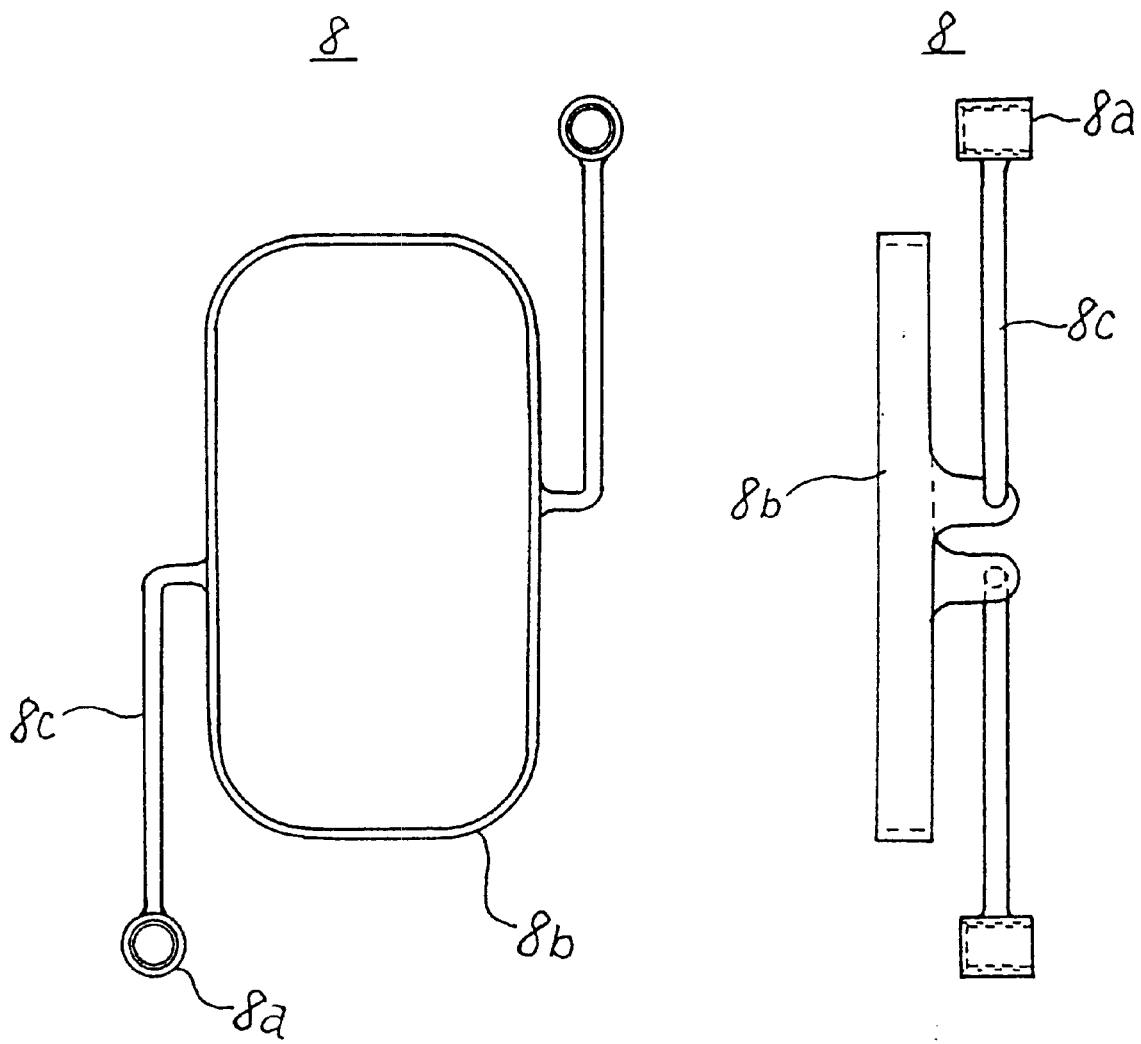
FIG. 3(a) and FIG. 3(b) are a plan view and a side view respectively showing a construction of an electric-field relaxation shield according to Embodiment 1 of the invention.

The electric-field relaxation shield 8 is, as shown in the plan view in FIG. 3(a) and the side view in FIG. 3(b) in detail, composed of an annular metal plate manufactured by forming a band of metal into a ring. The electric-field relaxation shield 8 has an integral construction composed of an electric-field relaxation shield portion 8b surrounding the internal conductor and being concentric with the internal conductor, a cylindrical metal fixing seat 8a arranged outside the electric-field relaxation shield portion 8b, and a metal bar 8c for joining the foregoing electric-field relaxation shield portion 8b and the fixing seat 8a into one body. The fixing seat 8a has a hollow hole through which the male screw 9 integrally fixed onto the ground tank 1 passes.

A main circuit current of the gas-insulated switchgear of above construction flows a passage through the internal conductor 7, the disconnector blade-supporting conductor 5, the disconnector blade 4, a disconnector fixed terminal 6, and the breaker 2 in the order named. The function of the electric-field relaxation shield is the same as in the forgoing prior art.

The gas-insulated switchgear of this invention has a construction in which the disconnector blade-supporting conductor 5 is accommodated in the container portion 3a of the resin mold bushing 3, and the supporting portion of the disconnector blade 4 is accommodated in the container portion 3a. As a result, the existence of the annular insulating portion makes it possible to increase an area facing the ground tank 1 and a spatial insulation distance, and it is possible to lower the blade-supporting conductor 5 to a height near a face where the flange is mounted. It is therefore possible to diminish the height of the main body of the switchgear and miniaturize the gas-insulated switchgear as a whole.

In manufacturing the resin mold bushing 3, when the epoxy resin cures and shrinks in the manufacturing process, exfoliation force is generated on the boundary between the electric-field relaxation shield and the epoxy resin due to difference between coefficient of thermal expansion of the epoxy resin and that of the metal forming the electric-field relaxation shield. In this embodiment, even at the time of manufacturing, the whole electric-field relaxation shield is appropriately flexed with the fixing seat 8a, which serves as a fixing portion to a mold, as a fulcrum, and it is therefore possible to follow the shrinkage of the epoxy resin. As a result, it is possible to prevent generation of exfoliation on the boundary between the electric-field relaxation shield and the epoxy resin.

Moreover, since the electric-field relaxation shield 8 has an integral construction, it is possible to manufacture the electric-field relaxation shield 8 more easily and inexpensively by casting or the like.

Embodiment 2

Figure 4:
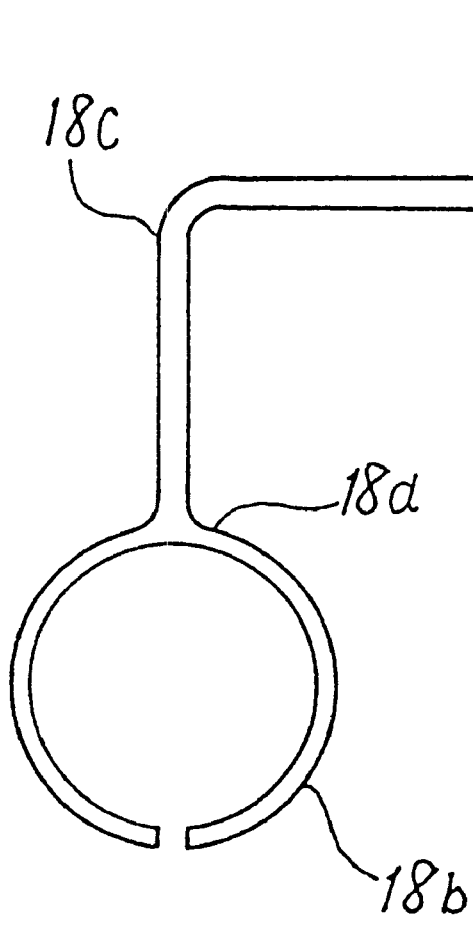
FIG. 4(a) and FIG. 4(b) are a plan view and a side view respectively showing a construction of an electric-field relaxation shield according to Embodiment 2 of the invention.
Figure 4:
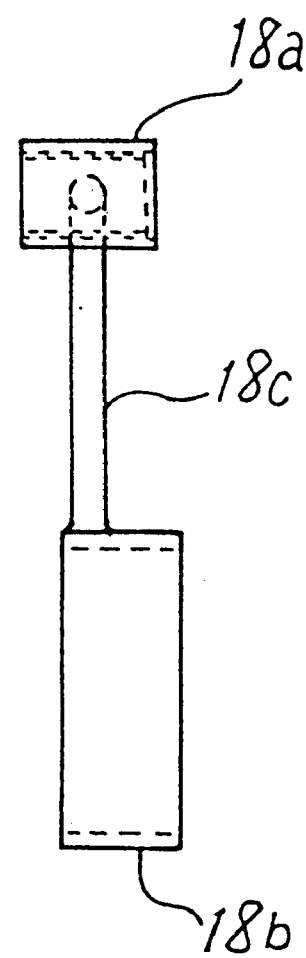

The plan view in FIG. 4(a) and the side view in FIG. 4(b) respectively show a construction of an electric-field relaxation shield 18 with one fixing seat according to Embodiment 2 of the invention. In this Embodiment 2, in order to cope with the exfoliation force generated on the boundary between the resin and the electric-field relaxation shield 18 at the time of manufacturing the resin mold bushing 3, the electric-field relaxation shield 18 has an integral construction in which a fixing seat 18a and an electric-field relaxation shield portion 18b are joined through a narrow metal bar 18c, whereby the elasticity follows the shrinkage due to flexibility with the fixing seat 18a serving as a fulcrum of the flexibility. Moreover, the annular shield portion 18b is provided with a slit, the annular metal plate is separated and divided, and the electric-field relaxation shield 18 is also flexed with a joining portion 18d of the shield portion 18b and the metal bar 18c serving as a fulcrum so as to further follow the internal stress at the time of manufacturing the resin. As a result, the advantage of preventing exfoliation on the boundary between the electric field relaxation shield and the mold resin is increased all the more. It is also preferable to form the slit under the condition of partly joining the annular electric-field relaxation shield portion.

Since the electric-field relaxation shield 18 is of an integral construction, it is possible to manufacture the electric-field relaxation shield 18 easily and inexpensively by casting or the like in the same manner as in the foregoing Embodiment 1.

What is claimed is:

1. A gas-insulated switchgear comprising:

a ground potential tank in which insulating gas is hermetically enclosed;

a breaker and a disconnector accommodated in said tank;

a resin mold bushing for supporting and insulating a main circuit conductor connected with said disconnector from said tank, the resin mold bushing possessing a container portion with an end opened at inside of said tank and being fixedly supported on said tank; and a blade-supporting conductor being connected with said main circuit conductor insulated and supported by said resin mold bushing, the blade-supporting conductor being installed in said container portion and supporting a disconnector blade of said disconnector.

2. The gas-insulated switchgear according to claim 1, wherein said resin mold molds an electric-field relaxation shield comprised of: an electric-field relaxation shield portion composed of an annular metal plate surrounding said main circuit conductor; a cylindrical fixing seat for fixing the tank installed outside said electric-field relaxation shield portion; and a metal bar for joining said electric-field relaxation shield portion and said fixing seat integrally into one body; and wherein the resin mold bushing also molds the container portion surrounding said main circuit conductor and having one end opened.

3. The gas-insulated switchgear according to claim 2, wherein said annular electric-field relaxation shield portion is provided with a slit.

* * * * *